July 28, 1931.  D. E. PIERCE  1,816,294

OIL PURIFYING SYSTEM

Filed Aug. 5, 1926

INVENTOR.
David E. Pierce
Cornelius L. Ehret
ATTORNEY.

Patented July 28, 1931

1,816,294

UNITED STATES PATENT OFFICE

DAVID E. PIERCE, OF WILMINGTON, DELAWARE, ASSIGNOR TO THE ATLANTIC REFINING COMPANY, OF PHILADELPHIA, PENNSYLVANIA, A CORPORATION OF PENNSYLVANIA

OIL PURIFYING SYSTEM

Application filed August 5, 1926. Serial No. 127,467.

My invention relates to the purification of hydrocarbon distillates, including gasoline, lamp oils and other petroleum products, with particular reference to naphthas formed by cracking of oils of higher boiling point.

In accordance with my invention, undesirable gum-forming and color-imparting bodies are removed from naphthas and other hydrocarbon oils.
Further in accordance with my invention, this purification is effected by bringing the vapors of the oil to be purified into intimate contact with a similar oil substantially free from these undesirable constituents; preferably flowing the oil counter-current to the naphtha vapors so that equilibrium is established between the liquid and vapors whereby the undesirable constituents pass from the vapor phase to the liquid phase.
Further in accordance with my invention, a quantity of liquid oil is continuously circulated into contact with the vapors, then through a purifying system where gum-forming and color-imparting bodies obtained from the vapor are removed from the liquid by suitable treatment, as by acid or by contact with fuller's earth or similar catalytic material, and finally back to the treating vessel.

Mineral oils, as naphthas and gasolines, particularly those formed by cracking higher boiling gas oils, fuel oils, etc., contain undesirable color-imparting and gum-forming compounds which cause a disagreeable color and odor and may deposit tarry, resinous material in storage tanks or in the carburetor of internal combustion engines. These undesirable compounds are unsaturated hydrocarbons, largely diolefines.

Various methods have been used for their removal, the most common of which is treatment with sulphuric acid, followed by neutralization and redistillation. Aside from the cost of the chemicals and redistillation, this method is unsatisfactory due to the high losses resulting from the reaction of sulphuric acid with other unsaturated materials, as olefines, which may not have a deleterious effect upon the oil under treatment, but on the other hand, in the case of motor fuel, are desirable constituents due to their ability to withstand higher compression in an internal combustion engine without detonation than do the saturated compounds.

It is an object of my invention to remove these objectionable compounds from oil by bringing the oil in vapor phase into intimate contact with liquid oil substantially free from diolefines and similar substances under such conditions that the vapor is scrubbed with the oil so as to effect a transference of the objectionable compounds from the vapor to the oil by the establishment of a substantial equilibrium between the scrubbed vapor and the oil. These objectionable bodies are subsequently removed from the liquid oil by suitable treatment, thus putting the liquid in condition for treating additional quantities of vapor. Preferably contact is effected in a column in which the liquid oil flows counter-current to the vapors so that the partially purified vapors are brought into contact with oil of increasing purity, thus ensuring most complete removal of gum-forming and color-imparting bodies.

My invention resides in the method and apparatus of the character hereinafter described and claimed.

For an understanding of my method and for an illustration of some of the forms my apparatus may take, reference is to be had to the accompanying drawings, in which.

Figure 1:
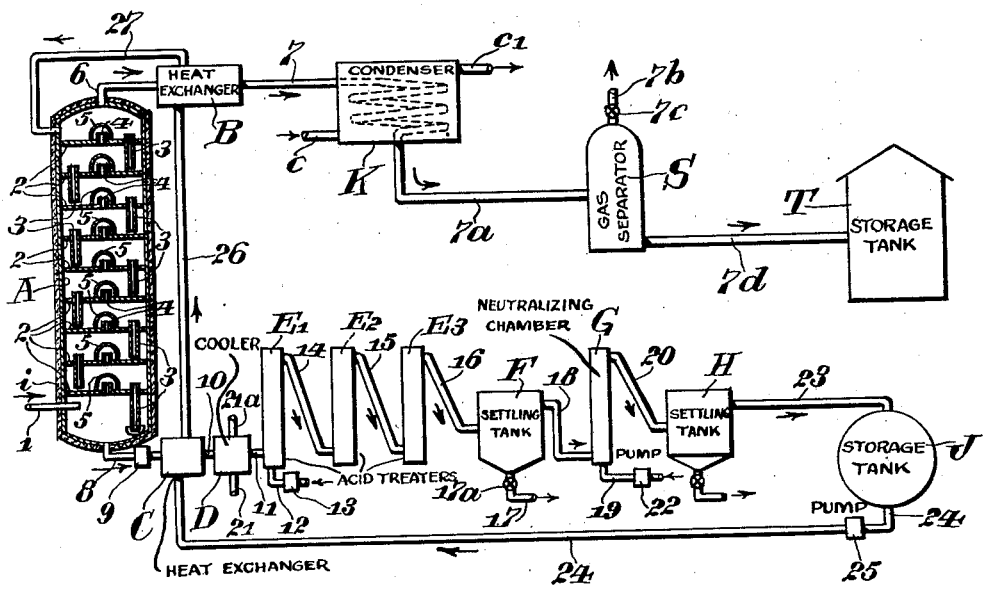
Fig. 1 is a schematic view of an oil-treating system constructed in accordance with my invention.

A column A to which leads the vapor line 1 from a cracking system is provided with suitable liquid-vapor contacting devices, for example the plates 2, provided with downflow pipes 3 and vapor uptakes 4, covered by the bubbler caps 5. A vapor line 6 leads to the heat exchanger B from which the line 7 leads to a condenser K traversed by a cooling medium passing through the inlet and discharge conduits $c$ and $c1$. From condenser K a line $7a$ leads to a gas separator S provided with the line $7b$ controlled by a valve $7c$ leading to a gasoline recovery system. A second line $7d$ connects the bottom of separator S with the storage tank T. Column A is preferably covered with heat insulating material i.

From the lower end of the column the line 8 leads to the heat exchanger C through the pump 9. From the heat exchanger the line 10 leads to the cooler D from which the line 11 extends to the lower end of the acid treating chamber E1. The lines 21 and 21a conduct water or other cooling medium to and from the cooler D. The acid treater E1 is connected by the line 14 to the treater E2 which in turn is connected by the line 15 to the treater E3 from which the line 16 leads to the settling tank F. The line 12, in which is the pump 13, leads from a supply of acid, not shown, to the lower end of the acid treater E1.

From the lower end of the settling tank F the line 17 controlled by the valve 17a leads to an acid recovery system. The line 18 leads from the upper end of the settling tank F to the neutralizing chamber G from which the line 20 leads to the settling tank H. The line 19 in which is the pump 22 leads from a supply of caustic soda or other neutralizing solution, not shown, to the lower end of the neutralizing chamber G.

From the settling tank H the line 23 leads to the storage tank J from which the line 24, in which is the pump 25, leads to the heat exchanger C. The line 26 extends from the heat exchanger C to the heat exchanger B from which the line 27 leads to the upper end of the column A where it discharges onto the topmost plate.

In the operation of the process the untreated vapors pass from a still or fractionating column, not shown, through the line 1 to the column A and pass upwardly through the vapor uptakes 4. Purified distillate, which has been preheated in the heat exchangers C and B, is discharged from the line 27 at a temperature substantially equal to that of the vapors, onto the topmost plate of the column and passes downwardly in intimate contact with the rising vapors which contain undesirable gum-forming and color-imparting compounds. Since the liquid is substantially free from such bodies successive equilibria are established between the descending liquid and rising vapors, whereby those components of the vapors which are not present in the liquid tend to pass from the vapor phase into the liquid phase. With the oil flowing countercurrent to the vapor the most impure vapor is brought into contact with liquid which contains the largest amount of undesirable components and as it rises through the column the vapor is brought into contact with oil of increasing purity until at the top, the vapor containing relatively small quantities of these undesirable components, is contacted with fresh liquid which removes substantially all the gum-forming and color-imparting bodies.

The vapor leaving the column through the line 6 passes to the heat exchanger B in which it serves to preheat the purified liquid which passes to the column. A portion of the vapors are condensed and the mixture of condensate and vapors passes to the condenser K from which the treated distillate passes to the separator S where the major portion of the gas separates from the liquid and is discharged through conduit 7b, the liquid passing by way of line 7d to the tank T.

The liquid passing downwardly through the column becomes progressively richer in diolefines and similar compounds and is withdrawn from the bottom through the line 8 and led to the purifying system in which these compounds are removed thus putting the liquid in condition for the treatment of additional quantities of distillate. The liquid, which is at a relatively high temperature, is forced by the pump 9 through the heat exchanger C in which it imparts a portion of its heat content to the treated liquid entering through the line 24 and leaving through the line 26. In the heat exchanger the treated liquid is heated while the impure liquid is cooled. The latter then passes to the cooler D where its temperature may be further reduced if necessary before it is treated with acid.

The cool liquid containing objectionable compounds passes into the lower end of the acid treating chamber E1 into which sulphuric acid is fed by the pump 13 through the line 12. The oil and acid are intimately mixed while passing through the series of treaters E1, E2 and E3, the acid reacting with gum-forming and color-imparting bodies to form a sludge which settles with the free acid to the bottom when discharged into the settling tank F. The acid treated oil collects above the sludge and acid layer. The bottom layer is withdrawn and pumped to an acid recovery plant or is discarded, while the oil, containing a small quantity of acid in suspension, is drawn off from near the top and is fed through the line 18 into the lower end of the neutralizer G. At the same time a caustic soda solution is continuously supplied to neutralizer G by the pump 22 through the line 19. The acid-containing oil and the alkaline solution are intimately commingled in the chamber G whereby neutralization is effected. From the neutralizing chamber G the mixture is discharged through the line 20 into the settling chamber H. Here the spent caustic solution with dissolved salts settles to the bottom while the now purified oil passes through the line 23 to the tank J. The purified oil is continuously circulated from the tank J through the line 24 and the heat exchangers C and B to the top of the column A in which it is utilized for the treatment of additional vapors.

Figure 2:
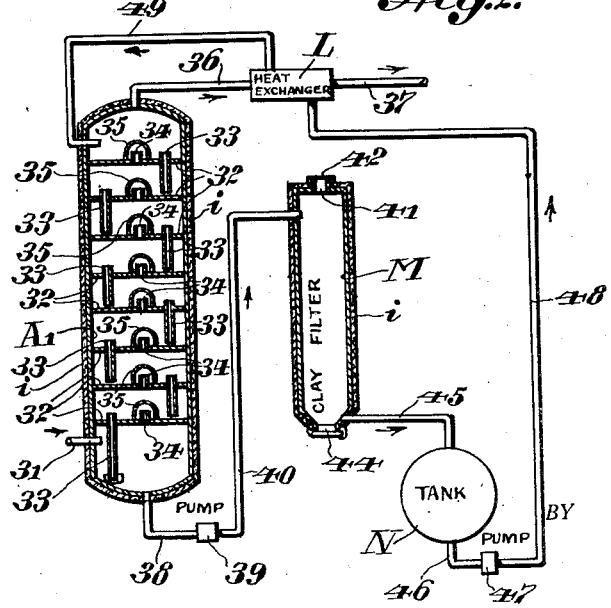
Fig. 2 is a schematic view of a modified type of system.

In the modification shown in Fig. 2 a column A1, similar to that used in the above described process, is connected to a source of vapor by the line 31. Liquid-vapor contacting devices, for example the plates 32, the downflow pipes 33, the vapor uptakes 34 and bubbler caps 35 may be provided. The line 36 leads from the top of the column to the heat exchanger L from which the line 37 may transport the treated material to a condenser, separator and storage tank of the character indicated in Fig. 1.

From the lower end of the column A1 the line 38 leads to the pump 39 which, in turn, is connected by the line 40 to the upper end of the clay filter M. A charging hole 41 at the top of the filter is closed by a cover 42. A clay discharge 44 is provided at the lower end of the filter. Connected to the filter is the line 45 leading to the tank N. A line 46 leads from the tank to the pump 47 from which the line 48 leads to the heat exchanger L which in turn is connected to the upper end of the column A1 by the line 49. The column A1, the filter M and if desired, other portions of the apparatus, may be covered with heat insulating material $i$.

The operation of this process is similar to that described in connection with Fig. 1. The vapors containing objectionable compounds are fed through the line 31 into the column A1, where they are brought into intimate contact with a descending stream of purified distillate. The treated vapor leaves the top of the column through the line 36, passing through the heat exchanger L and finally to the condenser through the line 37.

The treating liquid containing objectionable bodies removed from the vapors is withdrawn from the column through the line 38 and is forced by the pump 39 through the line 40 which is shown discharging into the top of the filter so that the liquid oil passes downwardly through a body of fuller's earth, bauxite, carbon or other catalytic material which effects polymerization of the objectionable gum-forming and color-imparting compounds to form relatively high boiling compounds. If desired the liquid may be passed upwardly through the catalytic material which may be in a solid mass or in suspension in the liquid.

A portion of the high boiling polymers are absorbed on the surface of the clay, the remainder being dissolved in the oil. The oil, freed from the undesirable gum-forming and color-imparting bodies which were converted by the catalytic material to substantially non-volatile polymers, passes through the line 45 to the tank N. From this tank they pass to the pump 47, then through the line 48 to the heat exchanger L from which they are discharged through the line 49 onto the topmost plate of the column.

The polymers being substantially non-volatile do not effect the equilibrium between the liquid and vapor and may be allowed to accumulate in the circulating liquid up to a concentration of 10% or more. The liquid may from time to time be redistilled for removal of the polymers when their concentration becomes excessive.

In both processes the basic principle is the same, namely, the tendency to establish equilibrium between liquid and vapor causes undesirable components not present in the liquid to pass from the vapor phase to the liquid phase, thereby removing them from the vapors. Preferably, I utilize a liquid which is substantially free from color-imparting and gum-forming bodies, and which has a boiling range substantially the same as that of a liquid in equilibrium with the vapors. By the use of such a liquid substantially no fractionation is effected in that the composition of the vapor is practically unaltered by the treatment except by the removal therefrom of the comparatively small percentage of those objectionable bodies which it contains before treatment.

Examples of a specific treating liquid and of a specific liquid, the vapors of which may be purified by such treating liquid in accordance with my process, are: the treating liquid, by assay distillation, in accordance with the Standard A. S. T. M. method, to have a boiling range substantially as follows: initial boiling point 112 degrees C., 20% off at 171 degrees C., 40% off at 186 degrees C., 60% off at 196 degrees C., 80% off at 215 degrees C., and an end point of 248 degrees C.; it should show no substantial deposition of residues when 100 cubic centimeters are evaporated in a copper dish in an atmosphere of air; the liquid to be treated, by assay distillation, to have a boiling range substantially as follows: initial boiling point 60 degrees C., 20% off at 105 degrees C., 40% off at 118 degrees C., 60% off at 138 degrees C., 80% off at 163 degrees C., and an end point of 211 degrees C. It is to be understood that for each particular hydrocarbon oil to be treated in accordance with my process, the particular liquid hydrocarbon oil used in such treatment is to be determined by one of the well-known methods for determining what liquid will be in equilibrium of vapors of a given liquid. An example of apparatus for preparation of equilibrium liquids, and a description of how the apparatus should be used, are found in an article by R. E. Wilson and D. P. Barnard, 4th, in volume 13, Journal of Industrial and Engineering Chemistry, pages 906 et seq.

My process has the advantage over the commonly used processes of purifying mineral oils from such objectionable bodies in that by its use it is unnecessary to condense and redistill the vapor to effect treatment, my purification being accomplished virtually in the vapor phase. The quantity of liquid which must be treated for purification is furthermore much less than would be the case if the entire vapor were condensed and treated by acid, clay or other means.

While a fractionating column of the bubbler plate type is shown for effecting intimate contact between vapor and liquid, the invention is not limited to this type of apparatus, any device, such as a packed column, which effects admixture of a vapor and liquid, being suitable.

Furthermore, I do not wish to be limited to the two methods disclosed for purifying the treating oil, for any other method which effects this purification may be utilized.

It shall be understood that the liquid hydrocarbon oil is "substantially free" of such gum-forming and color-imparting bodies as are to be removed from the oil vapors when it is sufficiently free of such bodies as to effect the desired purification to substantial and practical extent; and it will therefore be understood that the term "substantially free" as employed in the appended claims imports no limitation further than that aforesaid.

What I claim is:

1. In a process for the removal of gum-forming and color-imparting bodies from hydrocarbon oils, the step which consists in scrubbing the oil in vapor phase with liquid hydrocarbon oil substantially free from such bodies and of such character that it is in itself sufficient substantially completely to remove said bodies from the vapors without causing polymerization of the bodies and without itself otherwise undergoing substantial change in composition or causing substantial change in the composition of the vapors.

2. In a process for the removal of gum-forming and color-imparting bodies from hydrocarbon oils, the step which consists in scrubbing the oil in vapor phase with liquid hydrocarbon oil substantially free from admixture with solid materials, substantially free from said bodies, and of such character that it is in itself sufficient substantially completely to remove said bodies from the vapors without causing polymerization of the bodies and without itself otherwise undergoing substantial change in composition or causing substantial change in the composition of the vapors.

3. A process for the removal of gum-forming and color-imparting bodies from hydrocarbon oils, which comprises passing the oil in vapor phase countercurrent to and in contact with a flowing stream of liquid hydrocarbon oil substantially free from such bodies and from admixture with solid materials, and of such character that it is in itself sufficient substantially completely to remove said bodies from the vapors without causing polymerization of the bodies and without itself otherwise undergoing substantial change in composition or causing substantial change in the composition of the vapors, passing the liquid oil after contact with the vapors to and through a purifying system where the gum-forming and color-imparting bodies are removed therefrom, and returning the purified oil into contact with additional vapors to be purified.

4. A process for the removal of gum-forming and color-imparting bodies from hydrocarbon oils, which comprises passing the oil in vapor phase upwardly countercurrent to and in contact with a descending stream of liquid hydrocarbon oil substantially free from such bodies and from admixture with solid materials, and of such character that it is in itself sufficient substantially completely to remove said bodies from the vapors without causing polymerization of the bodies and without itself otherwise undergoing substantial change in composition or causing substantial change in the composition of the vapors, continuously removing the spent oil from contact with the vapors, purifying it of gum-forming and color-imparting bodies, and continuously returning it into contact with additional ascending vapors to be purified.

5. A process for the removal of gum-forming and color-imparting bodies from hydrocarbon oils, which comprises passing the oil in vapor phase upwardly countercurrent to and in contact with a descending stream of liquid hydrocarbon oil substantially free from such bodies and from admixture with solid materials, and of such character that it is in itself sufficient substantially completely to remove said bodies from the vapors without causing polymerization of the bodies and without itself otherwise undergoing substantial change in composition or causing substantial change in the composition of the vapors, continuously removing the spent oil from contact with the vapors, treating it with sulfuric acid to effect removal therefrom of the gum-forming and color-imparting bodies, and continuously returning it into contact with additional ascending vapors to be purified.

DAVID E. PIERCE.